United States Patent [19]
Olsen et al.

[11] Patent Number: 5,383,283
[45] Date of Patent: Jan. 24, 1995

[54] AUTOMATED DIAMETER GAUGING SYSTEM

[75] Inventors: Steven L. Olsen, Plain City; Kim D. Riding, Hyrum, both of Utah

[73] Assignee: Morton International, Inc., Chicago, Ill.

[21] Appl. No.: 968,010

[22] Filed: Oct. 29, 1992

[51] Int. Cl.$^6$ .............................................. G01B 5/08
[52] U.S. Cl. .................... 33/555.1; 33/783; 33/804
[58] Field of Search ............ 33/549, 550, 551, 555.1, 33/555.2, 501.05, 810, 811, 783, 784, 803, 804, 805, 514.1

[56] References Cited

U.S. PATENT DOCUMENTS

| | | | |
|---|---|---|---|
| 2,849,797 | 9/1958 | Etchell | 33/804 X |
| 3,303,572 | 2/1967 | Vreeland, Jr. | |
| 4,543,725 | 10/1985 | Golinelli et al. | |
| 4,549,355 | 10/1985 | Sauer et al. | 33/783 |
| 4,593,473 | 6/1986 | Shimomura | 33/832 |
| 4,805,311 | 2/1989 | Fuchs | 33/555.1 |

FOREIGN PATENT DOCUMENTS

| | | | |
|---|---|---|---|
| 377345 | 3/1931 | Belgium. | |
| 892057 | 10/1953 | Germany | 33/803 |
| 8800262 | 2/1988 | Germany. | |
| 1447415 | 8/1976 | United Kingdom. | |
| 521451 | 7/1976 | U.S.S.R. | G01B 5/08 |
| 746173 | 7/1980 | U.S.S.R. | G01B 7/12 |

Primary Examiner—Alvin Wirthlin
Attorney, Agent, or Firm—Mark F. LaMarre; Charles N. Lovell; Gerald K. White

[57] ABSTRACT

A device for measuring the diameter and circumference of a flexible circular object which includes two movable gauge pieces. The flexible circular object to be measured is place between the two gauge pieces and compressed thus forcing the object to be measured to conform to the shape of the gauge. The distance separating the gauge pieces is measured and is compared to the gap produced by a reference. The length of separation is converted to diameter and circumference measurements by appropriate means.

2 Claims, 4 Drawing Sheets

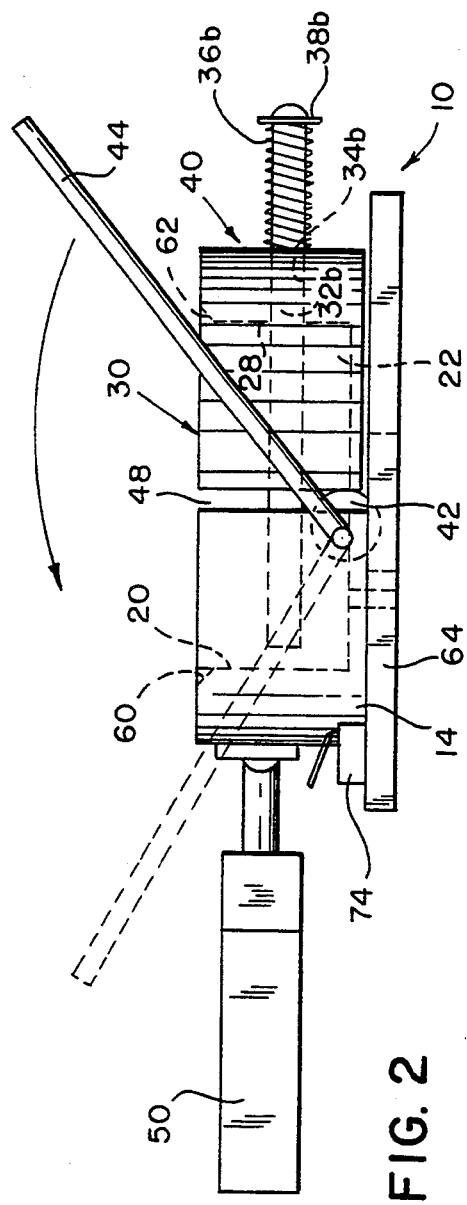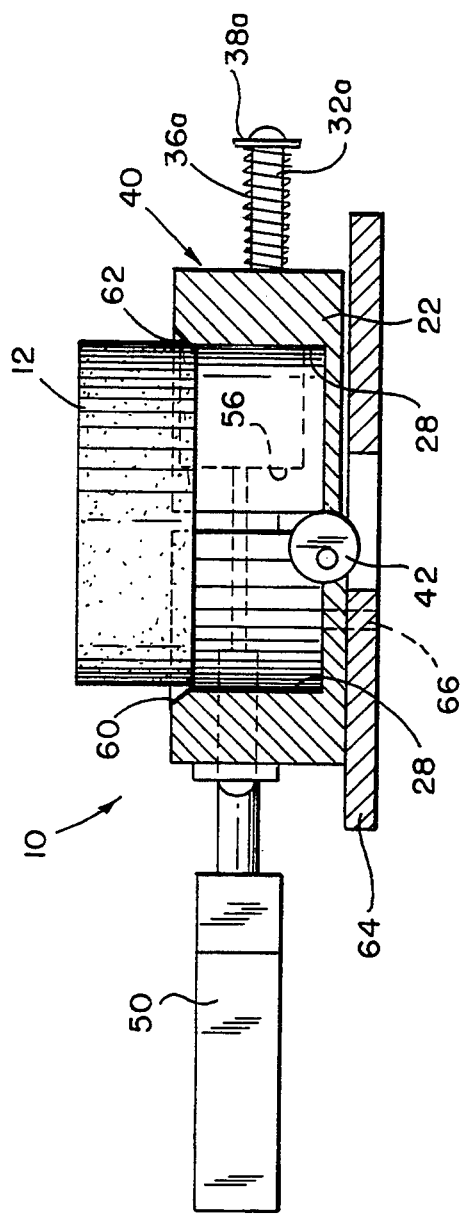

AUTOMATED DIAMETER GAUGING SYSTEM

BACKGROUND OF THE INVENTION

1. Field of the Invention

This invention relates to measuring systems for three-dimensional objects. In particular, this invention relates to an improved method of and apparatus for making the measurement of the diameter and circumference of three-dimensional objects which are easily deformable, wherein normal dimensions are difficult to maintain during measurement.

2. Description of Related Art

An air bag inflator for use in a driver side air bag module or a passenger side air bag module comprises an outer rigid housing, a filter unit containing filter screens and filter material, gas generating material, an inner housing, and igniter material. Screen elements, which are flexible units having a circular cross section, are normally manufactured by rolling individual units of screen cloth around a mandrel and spot welding the screen at a number of locations in order that the screen unit retains its circular cross section. Herein, flexible is defined as a semirigid object which is readily deformed from its normal shape by the application of light compressive force. These screen elements must be manufactured to within close tolerances to provide for proper assembly of the air bag inflator unit. Sample screen elements are tested periodically to verify conformance of the diameter and circumference of the screen elements to within specified tolerances.

Diameter and circumference measurements of the screen units must be done by means which do not distort the flexible screen elements in order to obtain the correct measurements. Also, the measuring device should be capable of correcting for screen elements which have been distorted from their normal shape due to handling. Therefore, conventional measuring devices such as calipers or the like cannot be used due to possible deformation of the screen element resulting in incorrect measurements.

Solutions have been suggested for the measurement of rigid cylindrical objects. Golinelli et al., U.S. Pat. No. 4,543,725; Vreeland, U.S. Pat. No. 3,303,572; and Geiler et al., U.S.S.R. Inventor's Certificate (11) 521451, disclose devices for checking the external diametrical dimensions of rigid circular parts. Golinelli utilizes a support means and two feelers which move with respect to the support. A transducer provides an electrical signal proportional to the position of the feelers. Vreeland utilizes two probes mounted 90° from one another and connected by a spring member. As the diameter is measured, the spring member expands or contracts and the strain is measured and converted into diametrical measurements. Geiler discloses a gauge with three probes attached to two cylindrical half-rings compressed onto the object by twin springs. The gauge is held to the object to be measured by three axial stops. Measurement is taken by two fixed measuring probes and one sensitive measuring probe. These apparatus rely on measurement of cylindrical objects by probes contacting the object at a fixed number of points. Further, these apparatus do not readily compensate for objects which have an elliptical cross section.

Another measuring device known as a pi tape can be used to measure circumference. This apparatus has the advantage of accommodating the deformation of the object to be measured, but does not compensate for elliptical error. Further, this device is difficult to use and is prone to operator error due to variability in interpolation of the reading required of the operator to determine the final measurement. Alternative measurement systems include visual identification systems and laser gauging systems. These systems are accurate and highly reproducible. They are costly, however, and sometimes slow in operation.

SUMMARY OF THE INVENTION

An object of this invention is to provide a method of and apparatus for the accurate measurement of the cross section of flexible three-dimensional objects.

Another object of this invention is to provide an improved method of and apparatus for the rapid and accurate measurement of the diameter and circumference of readily deformable three-dimensional objects having a circular cross section.

Another object of this invention is to provide an improved method for making the measurement of a deformable three-dimensional object which when not deformed has a circular cross section.

Another object of this invention is to provide an improved method for making the measurement of a deformable three-dimensional object which has been deformed from a circular cross section by reshaping the cross section of the object to form a circular cross section and then measuring the object.

Another object of this invention is to provide a means for forming a flexible elliptical object into a circular shape and then determining the diameter and circumference of the object.

Another object of this invention is to provide an improved means for determining the diameter and circumference of a flexible circular tubular object, a means which is not substantially susceptible to operator error.

These and other objectives of the invention, which will become apparent from the following description, have been achieved by a novel device for measuring flexible objects having a circular cross section comprising a circle or sphere machined into a solid plate. The plate is then split along the axis thus forming a first caliper and a second caliper. The first caliper has a first surface and a second surface and the second caliper has a first surface and a second surface. One caliper piece is fixed to a base. A cylindrical or spherical pocket of particular size and shape conforming to the part to be measured is located symmetrical to the center axis of the two halves. The free caliper is attached in such a manner as to slide toward and away from the fixed caliper, capturing the part to be measured in the circle. The part being measured holds the two calipers apart by conforming to the inner shape of the gauge and opposing the forces moving the two calipers together. A gap is formed separating the two calipers. The length of the gap can be mathematically related to either the circumference or diameter of the part being measured.

Closing the calipers on the part places the part in compression. This forces the part to be symmetric and eliminates most of the irregular or elliptical shapes which may occur. Placing the part in compression also reduces the flexibility of the part and allows consistent and repeatable readings. Sensor readings are processed by a device capable of refining the data and providing it in a usable manner.

The first surfaces of the two calipers or gauge pieces may be connected by a flexural means such that a single gauge piece is formed. The gauge is then compressed around the flexible circular object to be measured and the distance of separation is determined. The separation is compared to that caused by a reference object and the result is converted to diameter and circumference measurements by appropriate means.

Further, this invention includes a method for measuring deformable three-dimensional objects comprising the steps of moving a first caliper relative and in linear relation relative to a second caliper, with a flexible object to be measured therebetween, thereby placing the flexible three-dimensional object under compression. The method of this invention also includes the step of determining the length of a gap separating the first caliper from the second caliper. This method of this invention also includes the step of comparing the length of the gap separating the first caliper from the second caliper when the flexible object to be measured is placed between the first caliper and the second caliper with the length of the gap separating the first caliper from the second caliper when a rigid reference object is between the first caliper and the second caliper. The method of this invention also includes the step of calculating the diameter of the three-dimensional object having a circular cross section by multiplying the difference in the length of the gap obtained from the previous step by 2, diving by $\eta$, and adding the diameter of the reference. The method of this invention also includes the step of providing an output.

BRIEF DESCRIPTION OF THE DRAWINGS

With this description of the invention, a detailed description follows with reference being made to the accompanying figures of drawing which form part of the specification, in which like parts are designated by the same reference numbers, and of which:

FIG. 2 is a side plan view of the measuring device illustrating the position of the first caliper, the second caliper, and the compression means;

FIG. 3 is a fragmented side plan view of the measuring device illustrating the compression means and the release mechanism;

DETAILED DESCRIPTION OF THE INVENTION

Figure 1:
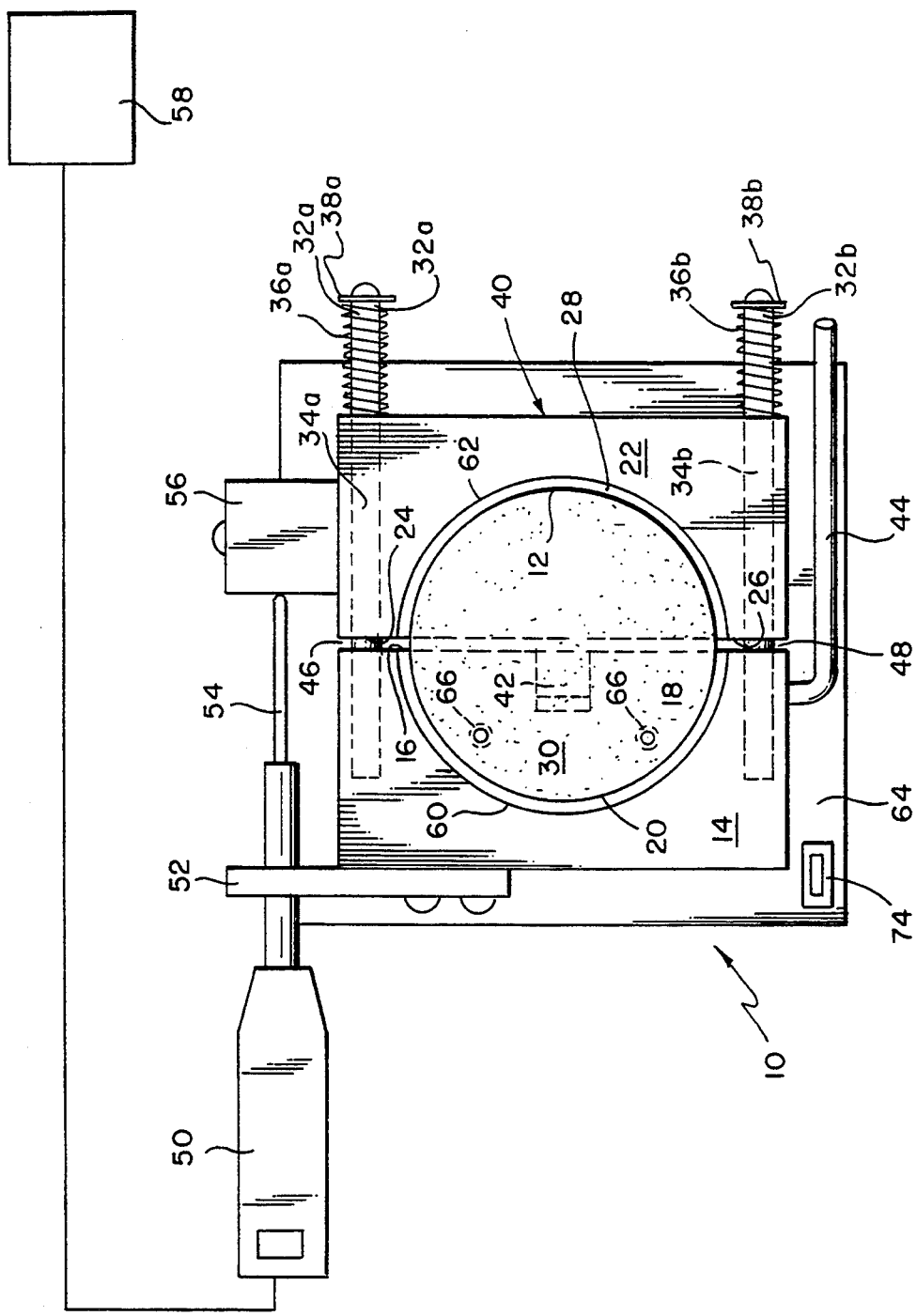
FIG. 1 is a top plan view of the measuring device illustrating the measuring device of this invention.

As best seen in FIG. 1, a measuring device shown generally at 10 is provided for measuring the diameter and circumference of a flexible object 12 (as shown in FIG. 3), having a circular cross section. The measuring device 10 includes a first caliper 14 having a first surface 16, a second surface 18, and an inner circular edge 20 and a second caliper 22 having a first surface 24, a second surface 26, and an inner circular edge 28. When the first caliper 14 is placed in side by side relationship to the second caliper 22, with the respective first surfaces 16 and 24 and second surfaces 18 and 26 opposite one another, a substantially circular opening 30 is defined. The first caliper 14 and the second caliper 22 are connected by linear tracks 32a and 32b. The linear tracks 32a and 32b are attached to the first caliper 14 and pass through channels 34a and 34b in the second caliper 22. Springs 36a and 36b on linear tracks 32a and 32b between end caps 38a and 38b and the second caliper side edge 40 exerts force on the second caliper 22 moving it toward the first caliper 14. The movement of the second caliper 22 is opposed by a cam 42 attached to a lever 44.

When lever 44 is moved cam 42 permits the second caliper 22 to move in a linear relation relative to the first caliper 14 placing the object 12 to be measured under compression. The gaps 46 and 48 formed between the first surfaces and the second surfaces respectively are measured by a distance measuring device 50 attached to the first caliper 14 by mounting fixture 52 with the measuring device probe 54 contacting stop 56 attached to the second caliper. This gap separating the first caliper 14 from the second caliper 22 is compared to the gap formed by a reference cylinder (not shown). The comparison is converted into appropriate units by a calculating means 58 attached to distance measuring device 50.

The first caliper 14 and second caliper 22 together form a circular gauge for measuring the diameter and circumference of flexible circular objects. The two calipers can be manufactured from a solid block of rigid material. A circular hole with a diameter equal to the nominal diameter of the calibration object is cut through the block. The top edges 60 and 62 (as shown in FIG. 2) of the first and second calipers respectively, may be beveled to aid in guiding the placement of the object 12 to be measured. Channels are drilled into the block on either side of the central circular opening. The block is then cut in half perpendicular to the channels by removal of about 0.1 inch of material. Straight tracks or rods are inserted into the channels to permit the two gauge sections to travel in a side-by-side substantially linear relationship to one another. The straight tracks or rods may be secured in one of the guide pieces thus permitting the second guide piece to move in a side-by-side substantially linear relation to the first guide piece. The first caliper can then be secured to a base 64 by fasteners 66 or the like to provide a mounting surface for other components. The straight tracks extend beyond the edge of the second guide piece to accommodate compression means. Inserts (not shown) can be added to reduce the diameter of the gauge thus providing for the measurement of flexible circular objects of varying diameter. The inner edges 20 and 28, although shown herein as circular can be of any shape required to conform to the cross section of the object to be measured.

Figure 4:
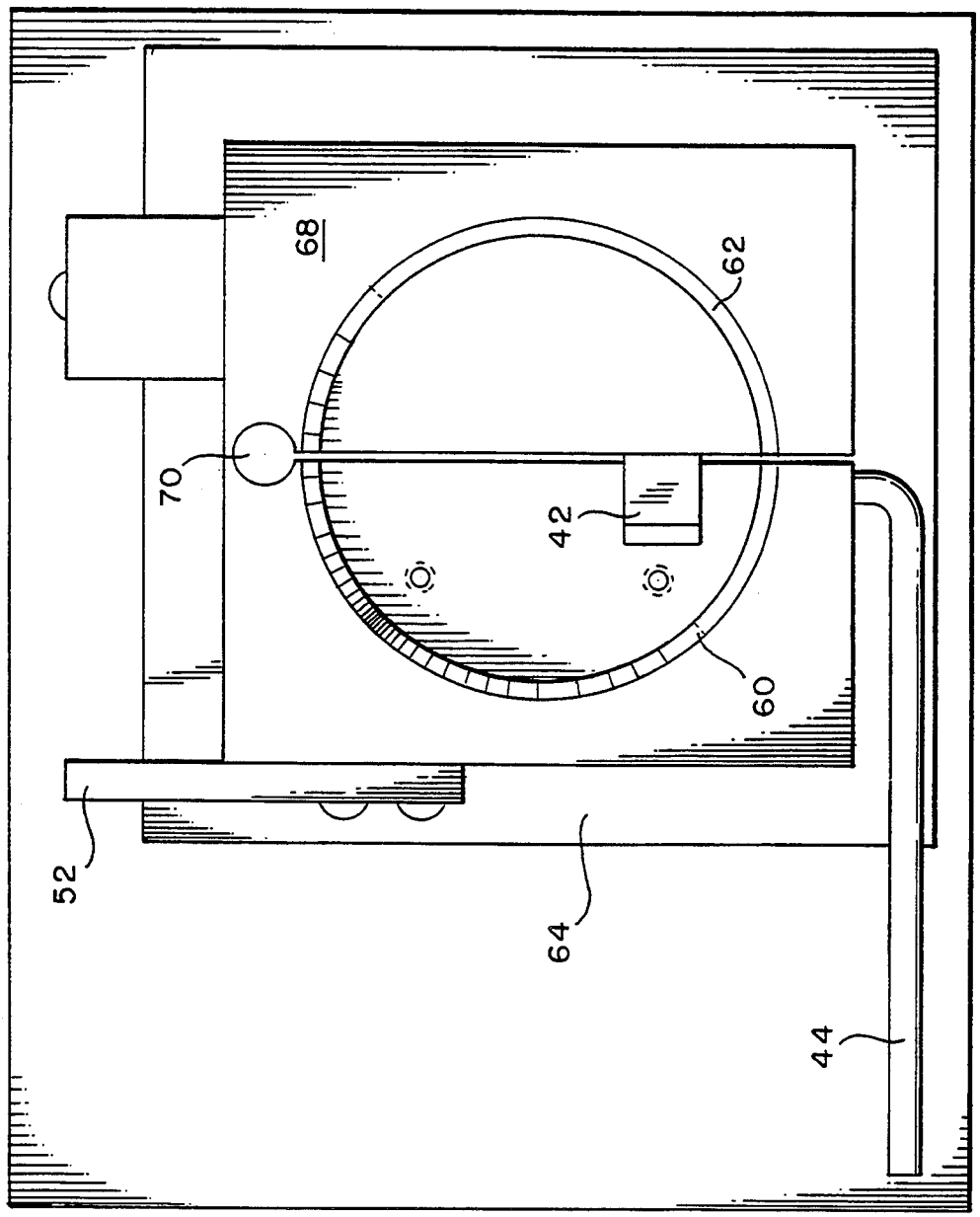
FIG. 4 is a top plan view of the measuring device illustrating the measuring device of this invention with a single piece gauge.

The two calipers or gauge piece may also be partially severed so as to leave a section connecting the first caliper 14 and the second caliper 22 effectively forming a single gauge piece 68, as shown in FIG. 4. The flexural section 70 thus formed can function as a compression means or a separate compression means may be provided.

The compression means forces the gauge sections together. The force provided by the compression means must be such that when conducted through the gauge sections the flexible object is compressed to conform to the circular opening formed by the two gauge pieces. The force provided by the compression means must be sufficient to force the flexible object to conform to the shape of the two gauge pieces; however, the compression means must not be such as to cause the flexible object to collapse or deform other than to conform to the shape of the gauge. The compression means can be any suitable means to meet the requirements stated hereinabove. A spring, pneumatic compression device, or a hydraulic compression device may be used. A spring is preferred due to low cost and low maintenance which results from its use.

Figure 6:
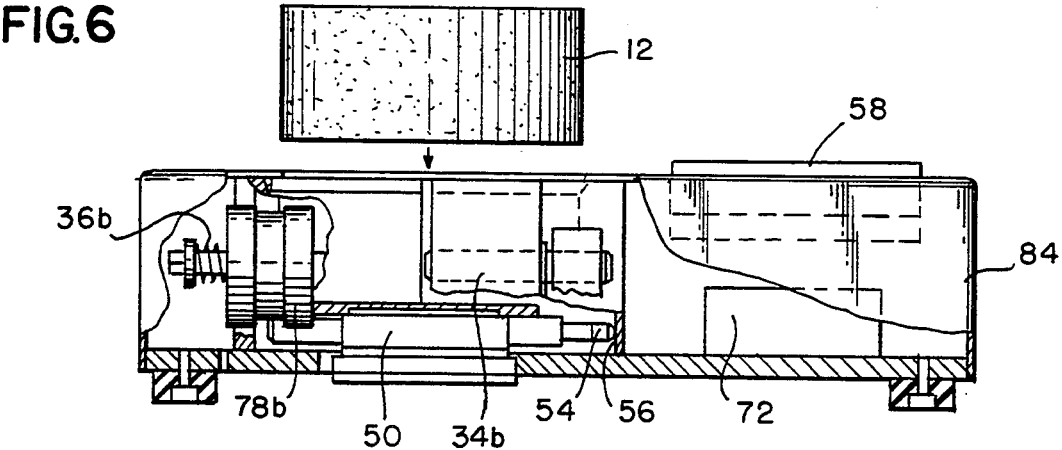
FIG. 6 is a front plan view of the measuring device further illustrating an alternate configuration of the device.

Once the flexible object to be measured has been compressed, the gauge pieces must still be separated by a slight gap. This gap is measured by any appropriate means such as a measuring tape, calipers, electronic measuring gauge digital measuring gauge or the like. A digital measuring gauge with a computer compatible output is preferred since the data can be outputted to a computational device for mathematical and statistical analysis. A device of this type, such as a DIGAMATIC INDICATOR ®, having a one-inch stroke and a standard BCD output, is manufactured by Mitatoyo Corporation, of Tokyo, Japan. A converter 72, as shown in FIG. 6, for the conversion from BCD to RS-232 or from BCD to IEEE can be used to provide a computer compatible output for the calculating device 58. Any suitable personal computer or hand held computational device can be used as the calculating device 58. An HP-48SX was used due to the ease of operation, size, and the presence of a built-in RS-232 interface. A program for the HP-48SX to take 5 readings, to convert the output of the Mitatoyo DIGAMATIC INDICATOR ® to a dimensional number, and to calculate the means and standard deviation appears at the end of the specification.

To measure a flexible object, an object is inserted into the measuring device between the first movable measuring device and second movable measuring device as shown in FIG. 3. Lever 44 is rotated so that the cam 42 separating the two gauge pieces is rotated down thus permitting the compression means to force the two gauge pieces together and compressing the flexible object to be measured and forming it into a circular shape. As the lever 44 completes its rotation it closes a microswitch 72 (as shown in FIG. 2) indicating a measurement is to be taken by the computer. The distance measuring device 50, which is mounted to the first caliper 14 by mounting fixture 52 contacts a stop 56 on the second caliper 22. The distance between the two gauge pieces is transmitted to the conversion device means 58 when the microswitch 72 closed. The gauge is zeroed periodically prior to the taking of measurements with the aid of a reference cylinder having a specified diameter. The computer then calculates the absolute diameter between the reference and the flexible object measured by taking the output of the gauge and applying it to the equation:

$$\frac{(\text{Gauge output}) * 2}{\pi} + \text{Diameter of Reference}$$

Several samples are measured and the average and standard deviation of the samples are calculated by mathematical routines available for the computer.

Figure 5:
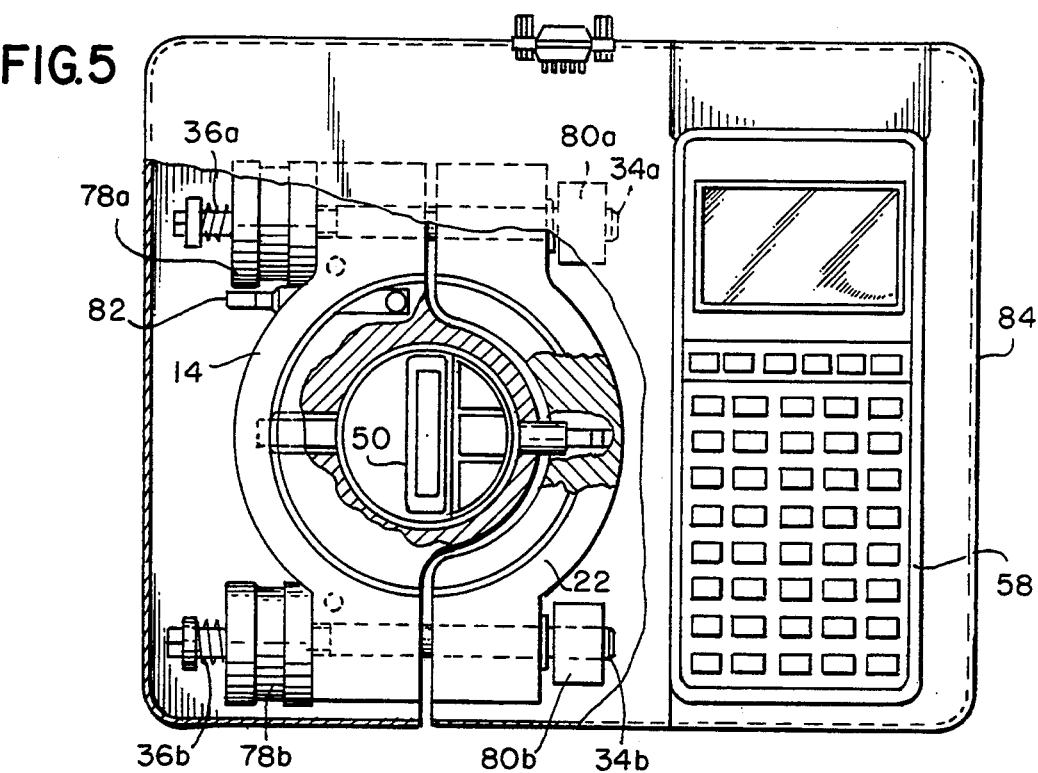
FIG. 5 is a top plan view of the measuring device illustrating an alternate configuration of the device.
Figure 5A:
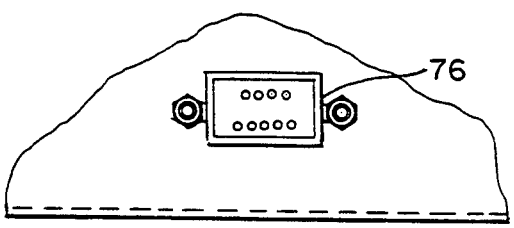
FIG. 5a is a close-up of a back plan view the device of FIG. 5 illustrating a computer compatible connector.

The components of this invention although illustrated in FIGS. 1-3 in one possible arrangement can be arranged differently for convenience and ease of operation without deviating from the intent of the invention. As shown in FIGS. 5, 5a and 6, for example, the measuring device 50 may be placed beneath the calipers to reduce the total area or "footprint" of the invention. The calculating means 58 may be located adjacent to the calipers or located some distance away. Converter 72 can placed below the calculating means 58 for convenience. An adapter 7e, as shown in FIG. 5a, is provided to attach the device of this invention to a computer or the like is provided. Pneumatic pistons 78a and 78b may be used in place of lever 44 and cam 42 to separate the calipers. The linear tracks 34a and 34b are secured by track supports 80a and 80b. A sensor 82 detects the presence of the object 12 to be measured. The pneumatic pistons 78a and 78b are then deactivated thus allowing springs 31a and 31b to compress object 12 and a measurement is taken. A cover 84 is provided to protect the device.

Thus, in accordance with the invention, there has been provided a method of and apparatus for the rapid and accurate measurement of the diameter and circumference of readily deformable three-dimensional objects having circular cross section. There has also been provided an improved method for making the measurement of a deformable three-dimensional object which when not deformed has a circular cross section. There has also been provided an improved method for making the measurement of a deformable three-dimensional object which has been deformed from a circular cross section by reshaping the cross section of the object to form a circular cross section and then measuring the object. There has also been provided an improved method of and apparatus for forming a flexible elliptical object into a circular shape and then determining the diameter and circumference of the object. Additionally, there has been provided an improved method and apparatus for determining the diameter and circumference of a flexible circular tubular object, the means which is not substantially susceptible to operator error.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

PROGRAM
HP-48SX PROGRAM FOR FLEXIBLE CYLINDER DIAMETER GAGE

```
%%HP: T(3)A(D)F(.);
    << { 1200 0 0 0 3 3           ;INITIALIZE CALCULATOR
    } 'IOPAR' STO 3 FIX
CLLCD CLEAR OPENIO
BUFLEN DROP SRECV
CLEAR 1 5                          ;START LOOP TO GET 5 READINGS
    FOR i                          ;SEARCH FOR DATA ON BUFFER (LOOP)
        DO BUFLEN DROP             ;FROM HEIGHT GAGE
        UNTIL 12 = =               ;IS DATA IN PROPER FORMAT?
```

| PROGRAM |
| --- |
| HP-48SX PROGRAM FOR FLEXIBLE CYLINDER DIAMETER GAGE |

| | |
| --- | --- |
| END 12 SRECV | ;IF YES, INPUT DATA |
| DROP OBJ —> DROP NEG | ;STRING TO NUMERICAL |
| 2 * pi / PLGDIA + DIAMETER | ;FORMULA TO CONVERT GAGE OUTPUT TO |
| DUP —>STR DISPLAY | ;FORMAT SINGLE READING, OUTPUT TO |
| "Reading = " SWAP + | |
| 1 DISP i —>STR | |
| "Sample # = " SWAP | |
| + 2 DISP | |
| NEXT | |
| "Calculating" 3 | |
| DISP SPC CLOSEIO | ;CALL SPC SUBROUTINE, END |
| >> | |
| %%HP: T(3)A(D)F(.); | ;SPC SUBROUTINE |
| << 9.E99 'MIN1' STO | ;INITIALIZE VARIABLES |
| —9.E99 'MAX1' STO | |
| CL GS DEPTH 'N' STO | ;CLEAR STAT REGISTER |
| DO 'B' STO | ;CALCULATE SAMPLE RANGE |
| IF 'B<MIN1' | |
| THEN 'B' RCL | |
| 'MIN1' STO | |
| END | |
| IF 'B>MAX1' | |
| THEN 'B' RCL | |
| 'MAX1' STO | |
| END 'B' RCL GS+ | ;ENTER DATA INTO STAT REGISTER |
| UNTIL DEPTH 0 == | |
| END MEAN 'Xbar' | FORMAT AVERAGE AND RANGE OUTPUT, |
| DISPLAY | |
| —>TAG MAX1 MIN1 — | |
| 'Range' —>TAG N | |
| 'Samples' —>TAG | |
| >> | |

We claim:

1. A method for measuring flexible three-dimensional objects comprising the steps of:
   a. moving a first caliper, said first caliper having a first surface and a second surface, in a substantially linear relation relative to a second caliper, said second caliper having a first surface and a second surface, such that when said first surface and said second surface of said first caliper are placed opposite said respective first surface and said second surface of said second caliper an opening is defined which conforms substantially to the surface of the object to be measured, with a flexible object to be measured placed there between, thereby placing a flexible three-dimensional object to be measured under compression, wherein the flexible object to be measured conforms to the shape of the opening defined by the first caliper and said second caliper;
   b. determining the length of the gap separating said first caliper from said second caliper;
   c. comparing the length of the gap separating said first caliper from said second caliper when the flexible object to be measured is placed between said first caliper and said second caliper with the length of the gap separating said first caliper from said second caliper when a rigid reference object is placed between said first caliper and said second caliper to determine a resultant length;
   d. calculating a diameter from the resultant length obtained in part C by taking the difference between the length of the gap separating said first caliper from said second caliper when the flexible object to be measured is placed between said first caliper and said second caliper; and the length of the gap separating said first caliper from said second caliper when a circular reference object is between said first caliper and said second caliper, multiplying the difference by two and dividing by $\eta$; and adding the diameter of the reference; and
   e. providing an output.

2. The method of measuring of claim 1 wherein the compression force applied is sufficient to force the flexible object to conform to the shape of the two calipers but is insufficient to force the flexible object to deform other than to conform to the shape of the two calipers.

* * * * *